Oct. 23, 1928.                                    1,688,634
G. HUTCHINSON
WEIGHING MECHANISM OR SCALE
Filed Sept. 14, 1925        2 Sheets-Sheet 2
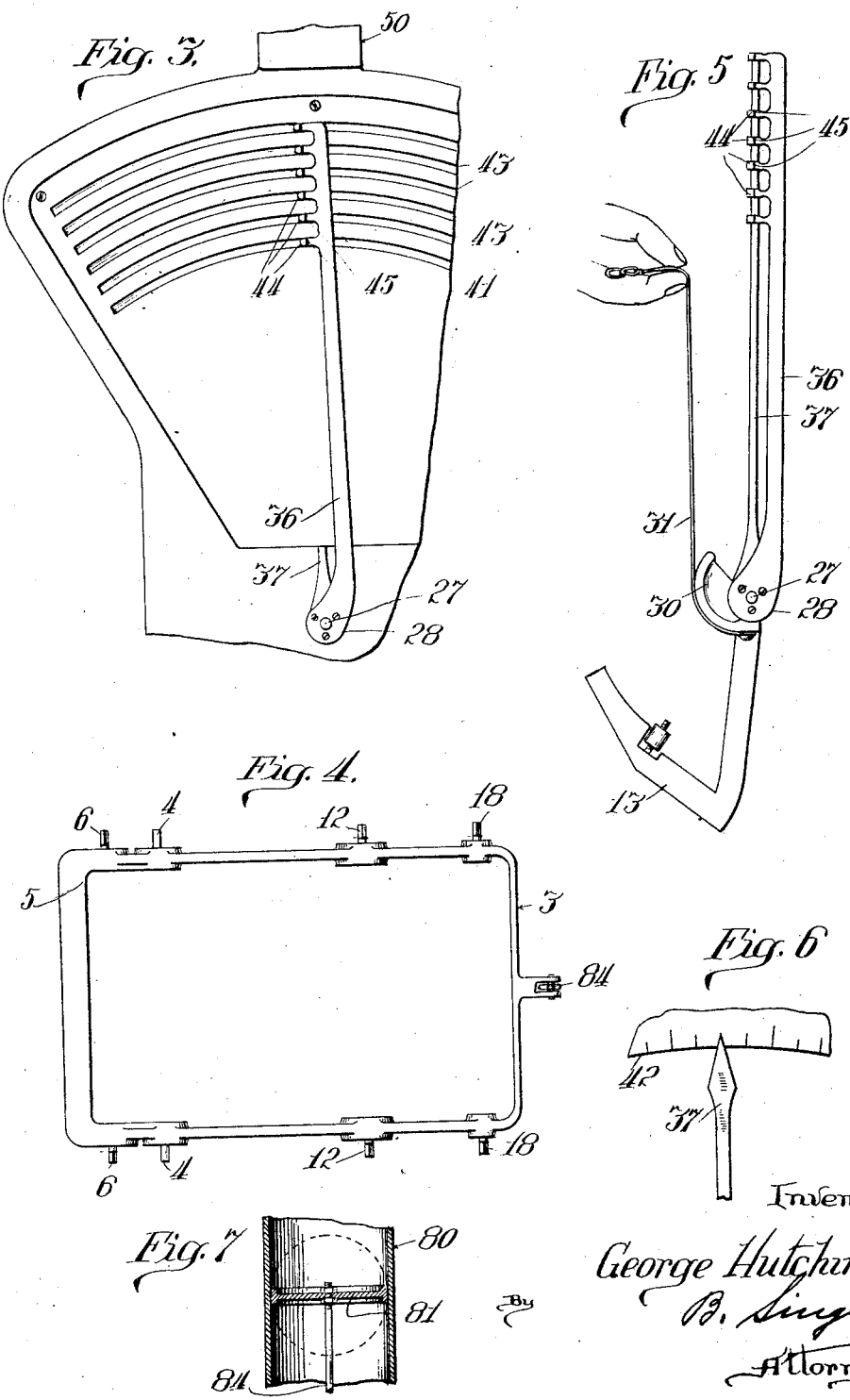

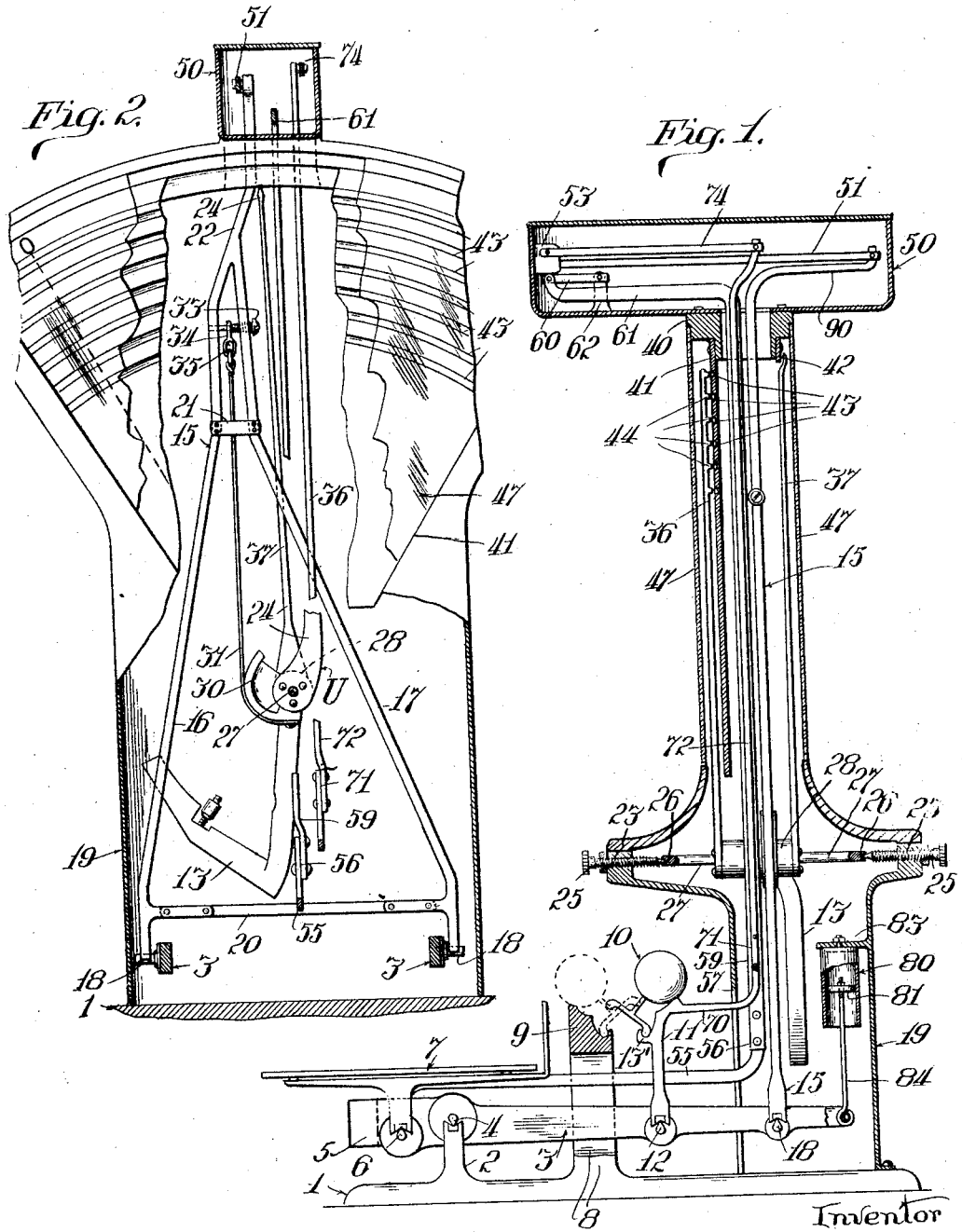

Patented Oct. 23, 1928.

1,688,634

UNITED STATES PATENT OFFICE.

GEORGE HUTCHINSON, OF SHEBOYGAN, WISCONSIN, ASSIGNOR TO HUTCHINSON SCALE COMPANY, OF SHEBOYGAN, WISCONSIN, A CORPORATION OF WISCONSIN.

WEIGHING MECHANISM OR SCALE.

Application filed September 14, 1925. Serial No. 56,374.

This invention relates to improvements in weighing mechanisms or scales.

It is an object of the invention to provide a scale in which a load counterbalancing element is actuated by a pulling action from above.

It is also an object of the invention to provide a scale wherein the beam normally located below the counterbalancing element actuates the latter through an intermediate member movably supported on the beam, said movable member being associated with the deflectable structure of the counterbalancing element and indicator device by a strap.

It is also an object of the invention to provide a scale of this character in which, in spite of the low arrangement of the beam, the bearing for the deflectable structure of the counterbalancing element and indicator device will be subjected to pressure from either below or above, as contrasted with the customary knife edge bearings, which can be subjected to pressure from one direction only permitting a slippage of parts as in knife edge bearings.

It is also an object of the invention to provide bearings for the deflectable unit which will properly support said unit in all deflected positions the bearings being of the nature of trunnion bearings, adapted to be manufactured with a high degree of accuracy and readily adjustable, and not permitting slipping movements as in the case of knife edge bearings.

With these and numerous other objects in view, the invention is described in the following specification and illustrated in the accompanying drawings, in which:

Figure 1 is a longitudinal section thru a scale of this character.

Figure 2 is a transverse vertical section through the same to illustrate the member from which the strap which actuates the deflectable structure is suspended;

Figure 3 is a fragmentary front elevation of the dial forming part of the indicator device, with an indicator pointer bar;

Figure 4 is a top plan view of a scale beam with the means for supporting the upright element;

Figure 5 is a detail elevation of the deflectable structure removed from the scale mechanism, showing the position it assumes when freed from its bearings and hung from the strap;

Figure 6 is a detail elevation of a portion of the indicator device, and

Figure 7 is a fragmentary sectional view of a dash-pot which may be advisably used in connection with this scale.

The invention is illustrated in the form of a counter scale, although it is obvious that other forms of scales may be constructed in accordance with the principles of the present invention.

The scale, as illustrated in Figures 1 and 2, is of the computing type and is therefore equipped with a chart on which not only the weight of the commodities but also the values of commodities at certain unit prices is indicated. The chart indicating these weights, as well as the units prices and values, is shown to be of the fan type although the invention will lend itself likewise to application on scales having a different type of chart.

The frame of the scale may comprise a base plate 1 from which rise the posts 2 (one only being shown) for the support of the scale beam 3 by knife edges 4. The beam is constructed in the present instance as a substantially rectangular yoke having weighted rear ends 5 and on which are also secured projecting knife edges 6 acting as supports for a pan 7 on which the material to be weighed is placed.

Another set of posts 8, rising from the base 1 of the frame, may serve as a support for a bench 9 on which loose weights 10 may be located, said weights being adapted for use in enlarging the weighing capacity of the scale in a known way. The weights illustrated in Figure 1 are of the type described in detail in a copending application, although it is obvious that any other type of loose-weight or sliding or swinging weight may be made use of for enlarging this weighing capacity. In order to bring said loose weights 10 into cooperation with a movable element of the scale, posts 11 are supported on knife edges 12 projecting from the beam, said posts serving as carriers for a bench 13' on which the loose-weights 10 may rest when associated with the beam 2.

The deflection of the beam produced by the weight on the platform or pan is utilized for actuating a deflectable unit, comprising a load counterbalancing device with an indicator device attached thereto, the movement of which may be proportional to the weight placed on the platform. The load counterbalancing element in the present instance, as in similar types of scales, is constructed as a pendulum 13, Figure 2.

The connection between the beam and the counterbalancing element is in most scales a strap extending from the beam upward and pulling downward to deflect the pendulum. It has been found, however, that a pulling action from above is more favorable as it produces a uniformly distributed strain on the bearings, and owing to the greater length available for the connecting element, the scale may be made with a higher degree of accuracy than in the case of a shorter connection, in which any deviation from the standard dimensions would naturally imply a larger percentage value of inaccuracy. With a longer connecting element inaccuracy in the location of the beam knife edges relative to the pendulum bearing causes less harm than with a short connecting element.

It has already been proposed in counter scales to effect this peculiar actuation of the deflectable unit from above, and for this purpose in prior scales the beam was disposed at a considerable height above the support of the pendulum. This, however, led to a construction of a scale which did not lend itself as readily to practical use. In the present embodiment the beam is located below the load platform and below the pendulum bearings, but the actuation of the load counterbalancing element or indicator device is attained from above.

For this purpose a support for the attachment is directed upward and is under control of the beam by being loosely supported thereon. It serves as a means of attachment for a flexible member or strap through which the beam is connected with the load counterbalancing element.

A bracket 15 comprising two upright members 16, 17, which terminate below in bearing portions engaging the knife edges 18 on the beam, rises from the beam. The uprights 16, 17 converge towards each other, as indicated in Figure 2, to render the structure more compact and to permit the bracket to be placed readily within the housing 19 with which scales of this character usually are equipped. In order to increase the rigidity of this bracket 15 a transverse member 20 is interposed between the two uprights 16, 17 of the same near the foot thereof, this transverse member being either integral with said uprights or being fixedly but removably attached thereto, as shown in Figure 2, to facilitate the assembly and disassembly of the structure. Another transverse member 21 is located at a relatively great distance therefrom at a point at which the two converging portions of the uprights merge into approximately parallel elements, which last named elements, again at a distance from said second transverse member 21, are united to form a single extension 22.

The housing 19 for the indicator and load counterbalancing element also is utilized to support bearings 23 on which said load counterbalancing element 13 and indicator device 24, constituting together the deflectable unit U, are movably carried. The bearings are constructed in the present instance as trunnion screws 25 inserted transversely through walls of the housing 19 and terminating in points which enter sockets 26 at the ends of a transverse spindle 27 forming a part of the load counterbalancing structure 13 and load indicator device 24.

The load counterbalancing structure comprises a heavy pendulum, which in the present instance is illustrated as an arm with an angular loaded extension thereto, the upper portion of the arm terminating in a hub 28 fixed to the transverse spindle 27 rotatably supported in the trunnion screws 25. As in other scales of similar character, this pendulum or weighted arm 13 is associated with a cam 30 on which the actuating tension element or strap 31 is secured at one end, while the other end of said strap 31 is attached to a portion of the bracket or trestle member 15 associated with the beam. This attachment is effected in the embodiment illustrated by means of a screw 33, passing through the parallel parts of the bracket 15, a hook 34 terminating in a loop 35 being placed from above over the screw and engaging in an annular groove of the screw, and the upper end of the strap 31 being secured to the loop.

From Figure 5 it will be seen that if the entire deflectable unit which includes the counterbalancing element 13, as well as the movable portions of the indicator device, is suspended from the strap to hang freely, it will find its own balance. As shown in this figure, this deflectable structure has attained its balance and the pointers 36, 37 associated fixedly with the hub 28 of the pendulum are shown in the neighborhood of their central position. When the deflectable structure in this position is assembled with the mechanism of the scale, and if then the upward pull of the strap is caused to increase, by increasing the load of goods on the platform, causing the pendulum 13 to swing further, the pressure in the bearing sockets of the screws 25 then will be upward, adducing thereby relief of strain on the bearings which is desirable and which cannot be attained in ordinary knife edge bearings.

This means that, when the unit is in use in the scale, successive small movements of load on the goods pan, causing the upward lift of the strap to gradually increase, will at the same time cause the downward pressure of the unit upon its bearings to decrease. Such decrease will continue until the pendulum and pointers have reached the half-stroke position shown in Figure 5, at which stage there will be no pressure either upward or downward on the bearings because the strap will be carrying the whole of the weight of the unit. And, the intensity of the lift of the strap still increasing, the pressure of the unit in its bearings will thereafter be an upward one.

This construction causes a minimum of friction in the bearings, as contrasted with the construction hitherto general with a low platform, in which construction the strap pulls downward on the pendulum causing the bearings to support at all times the whole of the weight of the unit itself, with the pull of the strap intensifying, instead of relieving, such downward pressure.

Owing to the exactness at which this center of oscillation for the load counterbalancing element and the movable elements of the indicator device is maintained, it is now possible to utilize in a scale of this character an indicator chart the readings of which will be far more accurate than in ordinary scales. It is feasible, owing to this exactness of the maintenance of the center of oscillation, to provide in the indicator device a chart having portions which remain in unalterable relation with portions of the movable indicator elements. For this reason the construction is particularly adapted to be used with an indicator bar having spaced fingers which sweep over certain zones of a suitably arranged chart as, for instance, described in my copending application.

As in other scales of this character the indicator device comprises two charts, one presenting its face to the salesman and containing, in addition to the weight data, also the computed data of sales values, while the other chart presents its face to the customer and preferably contains the weight data exclusively. It is obvious, however, that both charts may be provided with similar data and that ordinary charts may also advantageously be used with a scale of the improved character described.

The housing 19 inclosing the load counterbalancing element 13 and the indicator device is provided in the embodiment illustrated with a top closure 40; to this closure member the two charts 41 and 42 are secured on opposite sides, the indications on the charts (not shown) being directed outward.

The computing chart 41 is shown to be of the improved type described in my copending application and having zones or grooves 43 recessed below in a plane different from the plane of the chart on which the indications appear. The pointer bar 36 in cooperative relation with this chart 41 is equipped with a plurality of fingers 44 which are deflected from the plane of the pointer bar to extend into these guiding zones or grooves, and these fingers are shown to be provided at a distance from their edges with indicating elements, as for instance interrupted lines 45 adapted by their alinement with the figures printed on the chart to greatly facilitate the exact reading of the values on the chart and to avoid any possibility of parallactic error. It is obvious that the two sides of the housing 19 for these parts of the mechanism are equipped with transparent plates 47 thru which the positions of the pointer bars 36 and 37 may be observed.

The cooperating pointer bar 37 is deflected by the movement of the load conterbalancing element 13 together with the pointer bar 36 so as to change its relation with respect to the customer's chart 42, illustrated here in the form of an arcuate strip displaying the weight indications.

In order to control the movements of those elements which are movably associated with the beam, as for instance the platform 7 holding the load to be weighed, the floating bench 13' which is intended to receive the loose-weights 10 enlarging the weighing capacity of the scale, and the trestle-shaped bracket 15 which serves as a means for attachment of the flexible tension element 31 connecting the beam 2 with the load counterbalancing structure 13, a plurality of check links is provided, this provision of check links being in general use in scales. But while in the ordinary scales these check links are usually placed below the beam and therefore require a relatively high substructure for the entire scale, in the present device the stems for the check links extend substantially upward from the respective elements associated with the beam and the check links are placed adjacent each other in an extension or auxiliary link housing 50 on top of the main housing or tree casting 19, which housing enables the parallelograms to be moved nearly vertical, and which may be utilized as a bracket for lamps (not shown) illuminating the charts or for some other desired purpose. The substructure of the entire scale, therefore, may be made very low to facilitate the positioning and removal of the load to be weighed, the manipulation of the loose-weights, and the entire reading of the charts, while the overall height of the scale is not materially increased, the increase, however, being effected at the top where it is far less disturbing than at the bottom end.

In the embodiment illustrated the extension 90 of the trestle bracket 15 is cranked forward, projecting into the front portion of the auxiliary housing 50 and is flexibly connected with a link 51 having its point of oscillation in a lug 53 which projects from the opposite wall of the auxiliary housing. The extension 90 being cranked forward the link 51 is partly placed forward of, and partly behind, the fan casting, and the housing 50 extends accordingly in both directions at right angle to the plane of the fan casting. The rearward extension therefore is shortened so as not to interfere with goods placed on the platform. This link, therefore, will control the movement of the trestle bracket 15, retaining the same in approximately vertical position with respect to the base of the scale regardless of the deflection to which the beam is subjected under the influence of the load. The pan 7, also resting loosely on knife edges 6 of the beam, is under control of check links, a stem 55 being rigidly secured to the platform 7 and extending substantially horizontally through an opening 57 in the lower part of the housing 19. This stem is fixedly connected at 56 with an upright arm 59 extending in the rear of the chart 41 and approximately parallel to the bracket 15 through the opening in the top closure member 40 of the main housing where said upward extension, as shown, is provided with a horizontal angular extension 61. Near its end this angular extension of the arm or stem 55 is flexibly connected with a check link 60 having its fulcrum in a lug 62 which projects from the bottom part of the auxiliary housing or extension 50.

Similarly the floating bench 13' for carrying the loose-weights 10 is associated with a stem or arm 70 which is also rigidly secured within the interior of the housing at 71 to an upright extension 72, somewhat deflected, where this stem enters the link housing. This curved extension of the upper end of the stem again is connected with the lug 53 projecting from the end wall of the link housing 50 by a link 74 pivoted to said lug.

The length of these links naturally is determined by the distance of the knife edges on which the pertaining parts rest from those knife edges on which the beam is supported. The described arrangement of the check links provides for an extremely compact disposal of the same at a place at which these links and their supports will in no way interfere with the movement of the loads to be weighed upon the platform and will, therefore, permit the provision of a very low substructure for the scale, which is extremely desirable.

In order to absorb the vibrations of the beam and pendulum and thereby bring the pointers quickly to rest in the desired indicating position, a vibration absorbing device may be associated with the scale and may be connected with the beam in such manner as to facilitate this low positioning of the beam.

This is illustrated in the device shown by the arrangement of a dash-pot 80 relying upon the breaking effect of the air upon a piston 81 movable within the cylindrical pot. The dash-pot 80 is closed at its upper end and open at its lower end and is secured to a lug or bracket 83 projecting from the housing 19 of the scale. In order to render this attachment adjustable the screw securing the bottom of the dash-pot 80 to the bracket 83 passes through an enlarged opening in the bracket, and this arrangement will make it feasible to shift the dash-pot slightly on the bracket to attain the proper movement of the piston with respect to the walls of the dash-pot. A link 84 flexibly associated with the free end of the beam 2 carries at its head the piston 81 of peculiar construction adapted to slide within the dash-pot with a slight clearance, and to produce upon downward movement of the beam a temporary partial vacuum between the piston and the end of the pot until sufficient air can creep past the piston to equalize the pressures, while upon upward deflection of the beam the air between said piston and the closure of the pot will be temporarily slightly compressed. Thereby the air retards and cushions all deflections of said end of the beam and reduces vibration of same.

The outer surface of the piston is, therefore, not made cylindrical, as in most pistons for dash-pots, but it is spherical, or a portion of a sphere confined by two parallel planes at equal distances from the center of the sphere, of which this zone for the plunger or piston has been cut. Owing to this arrangement the air will be uniformly wire drawn past the circumference of the plunger or piston regardless of the angle of the connecting rod.

I claim:

1. In a scale having a base, the combination of a load counterbalancing element, a beam, means for transmitting motion from the beam to the load counterbalancing element, said means comprising a thrust member articulating with the beam and means for keeping such thrust member at a constant angle relatively to the scale base.

2. A scale having a beam, a load counterbalancing element, a bracket loosely supported on the beam, and means secured to the bracket for actuating the load counterbalancing element by a pulling action from above.

3. A scale having a load platform, a beam below the same, a load counterbalancing element, a bracket loosely supported by the beam, and means secured to the bracket for actuating the load counterbalancing element by a pulling action from above in accordance with the load on the platform.

4. A scale having a beam, an indicator device, a bracket loosely supported by the beam, and means secured to the bracket for actuating the indicator device by a pulling action from above.

5. A scale having a beam, an indicator device, knife edges on the beam, a bracket resting on said knife edges, and means on the bracket for actuating the indicator device by a pulling action from above.

6. A scale having a beam, a load counterbalancing element, knife edges on the beam, a bracket on said knife edges, and means on the bracket for actuating the load counterbalancing element by a pulling action from above.

7. A scale having a load platform, a beam below the same, a load counterbalancing element, knife edges on the beam, a bracket resting on said knife edges, and means on the bracket for actuating the load counterbalancing element by a pulling action from above in accordance with the load on the platform.

8. A scale having a beam, a load counterbalancing element, knife edges on the beam, a bracket resting on the knife edges, means on the bracket for actuating the load counterbalancing element by a pulling action from above, and means for maintaining the bracket in vertical position regardless of the angular position of the beam.

9. A scale having a load platform, a beam below the same, a load counterbalancing element, knife edges on the beam, a bracket resting on the knife edges, means on the bracket for actuating the load counterbalancing element by a pulling action from above in accordance with the load on the platform, and means for maintaining the bracket in vertical position at any operative position of the beam.

10. A scale having a beam, an indicator device which includes a cam, a bracket extending from the beam upward and loosely resting on the beam, and a strap secured to the upper portion of the bracket and connected with the indicator device to actuate the latter by a pulling action from above.

11. A scale having a load platform, a beam below the same, an indicator device which includes a cam, a bracket extending from the beam upward and loosely resting on the beam, and a strap secured to the upper portion of the bracket and connected with the cam of the indicator device for actuating the latter by a pulling action from above in accordance with the load on the platform.

12. A scale having a load platform, a beam, a load counterbalancing element, the beam being supported on knife edges and the load platform being carried by said beam, an additional set of knife edges on the beam, a bracket resting on said last named knife edges, and means on the bracket for actuating the load counterbalancing element by a pulling action from above, the knife edges for the beam, the platform and the bracket being in alinement with each other.

13. A scale having a beam, a load counterbalancing element, a bracket loosely resting on the beam and straddling the same, and means on the bracket for actuating the load counterbalancing element by a pulling action from above.

14. A scale having a load platform, a beam below the same, a load counterbalancing element, a bracket loosely resting on the beam and straddling the same, and means on the bracket for actuating the load counterbalancing element by a pulling action from above in accordance with the load on the platform.

15. A scale having a load platform, a beam below the same, an indicator device, a bracket resting on the beam and straddling the same, and means on the bracket for actuating the indicator device by a pulling action from above in accordance with the load on the platform.

16. A scale having a beam, a load counterbalancing element, a bracket loosely carried by the beam and extending from the beam upward, said bracket being formed of elements which converge in upward direction, and means on the bracket for actuating the load counterbalancing element by a pulling action from above.

17. A scale having a load platform, a beam below the same, an indicator device, a bracket loosely carried by the beam and extending from the beam upward, said bracket being formed of elements which converge in upward direction, and means on the bracket for actuating the indicator device by a pulling action from above in accordance with the load on the platform.

18. A scale having a beam, an indicator device including a fan-shaped chart and a pointer cooperating with the chart, a bracket loosely supported by the beam, and means on the bracket for actuating the pointer by a pulling action from above.

19. A scale having a load platform, a beam, an indicator device including a chart and a pointer bar cooperating with the chart, the chart being located in a plane at right angle to the oscillating plane of the beam, a bracket loosely supported by the beam, and means secured to the bracket for actuating the pointer bar by a pulling action from above.

20. A scale having a load platform, a beam below the same, an indicator device which includes a chart and a pointer bar cooperating with the chart, a bracket loosely supported by the beam and movable in a plane in the rear of the plane of the chart, and means secured to the bracket for actuating the pointer bar by a pulling action from above in accordance with the load on the platform.

21. A scale having a load platform, a beam, an indicator device including a chart and a pair of pointers cooperating with the chart, a bracket loosely supported by the beam, and means secured to the bracket for actuating the pointers by a pulling action from above.

22. A scale having a beam, an indicator device including a chart and a pair of pointers cooperating with the chart on opposite sides of the same, a bracket loosely supported by the beam, and means secured to the bracket for actuating both of the pointers by a pulling action from above.

23. A scale having a load platform, a beam below the same, a load counterbalancing element, a bracket loosely supported by the beam, means for actuating said load counterbalancing element by a pulling action from above in accordance with the load on the platform, said actuating means being secured to the bracket, and means for guiding the bracket, said guiding means being located above the platform.

24. A scale having a beam, an indicator device including a chart and a pointer bar, a bracket loosely resting on the beam, means secured to the bracket for actuating the pointer bar by a pulling action from above, and guiding means for the bracket, said guiding means being located above the chart.

25. A scale having a beam, a load counterbalancing element, a bracket loosely supported by the beam, means secured to the bracket for actuating the load counterbalancing element by a pulling action from above in accordance with the load on the platform, and a check link for the bracket located at the top of the same and above the load counterbalancing element.

26. A scale having a load platform, a beam below the same, an indicator device including a chart and a pointer bar, a bracket loosely supported by the beam, means secured to the bracket for actuating the pointer bar by a pulling action from above in accordance with the load on the platform, and a check link for the bracket located above the chart.

27. A scale having a beam, an indicator device comprising a chart and a pointer bar, a bracket loosely supported by the beam, means secured to the bracket for actuating the indicator device by a pulling action from above, an a check link for the bracket located above the chart and extending at right angle to the plane of the chart.

28. A scale having a load platform, a beam, an indicator device with an oscillatable pointer and a chart, the chart being located above the axis of the pointer, a bracket loosely supported by the beam, means secured to the bracket for actuating the indicator device by a pulling action from above, a check link for the bracket located above the chart, and a check link for the load platform adjacent the first named check link and located above the chart.

29. A scale having a load platform, a beam, an indicator device with a pointer bar oscillatable about an axis and a chart above the axis, a support for loose weights on the beam, a bracket loosely supported by the beam, means secured to the bracket for actuating the indicator device by a pulling action from above, a check link for the bracket, a check link for the load platform, and a check link for the loose weight support, all of said check links being adjacent each other and being located above the chart.

30. A scale having a housing provided with an extension near its upper end, a beam, operative elements and check links for the same, a load counterbalancing element, a bracket loosely supported by the beam, means secured to the bracket for actuating the counterbalancing element by a pulling action from above, and check links for said bracket and first named elements respectively, said check links being located in the extension of the housing.

31. A scale having a beam, a chart at right angle to the beam, a stem leading above the chart and cranked above the chart, and a link connected to the stem, and partly in front of and partly behind the chart.

32. In a scale, the combination of a beam, a mechanism movable in predetermined ratio to the movement of the beam, and means for transmitting motion from the beam to said mechanism, said motion transmitting means comprising a thrust member articulating with the beam and directed angularly away from the beam, and also comprising a connecting member attached to the thrust member and extending from said thrust member in a direction back towards the beam.

33. In a scale, the combination of a beam, a scale mechanism movable in a predetermined ratio to the movement of the beam, and means for transmitting motion from the beam to said mechanism, said motion transmitting means including a thrust member articulating with the beam and angularly related thereto, and a tension member secured to the thrust member and extending in a direction towards the beam from the point of its attachment to the thrust member.

34. In a scale, the combination of a horizontal beam, a bearing on the beam, a load counterbalancing element, a thrust member movably supported on said beam bearing and extending in angular direction from said beam, and a connecting element between said thrust member and the load counterbalancing element, said connecting element being directed from a point on the thrust member towards the beam.

35. In a scale, the combination of a horizontal beam, a bearing on the beam, a thrust member articulated on the bearing, a load counterbalancing element, and a tension member movably secured at one of its ends to a point of the thrust member and connected at the other end to the load counterbalancing element.

36. In a scale, the combination of a beam, a bearing on the beam, a load counterbalancing element and a tension member actuated from the bearing and adapted to transmit motion from the beam to the load counterbalancing element by a pulling action from above, the top of the tension member being located a substantial distance above the bearing.

37. In a scale, the combination of a horizontal beam, a scale mechanism movable in a predetermined ratio to the movement of the beam, and a tensile member controlled by the beam and having its upper end supported above the beam and above any rigid projections of the beam, and adapted to actuate the scale mechanism by a pulling action from above.

38. In a scale, the combination of a beam, a scale mechanism movable at a predetermined ratio to the movement of the beam, a bracket loosely supported on the beam, and a tensile member adapted to actuate the scale mechanism by a pulling action from above and having its top attached to the bracket above the beam.

39. In a scale, the combination of a beam, a scale mechanism movable at a predetermined ratio to the movement of the beam, a bracket loosely supported on the beam, a tensile member adapted to actuate the mechanism by a pulling action from above and having its top attached to the bracket above the beam, and a load platform located above the beam but below the top of the tensile member.

40. In a scale, the combination of a beam, a load counterbalancing element, a load platform, the beam having a fulcrum on which it is pivoted and having a fulcrum bearing for supporting the load platform, and having a third pivot, and means comprising a tensile member actuated from such third pivot to cause it to transmit motion from the beam to the load counterbalancing element by a pulling action from above, the three pivots being in alinement with each other, and the top of the tensile member being above the line connecting the three pivots.

41. In a scale, the combination of a horizontal beam, a scale mechanism operable by said beam, means under control of the beam for actuating said mechanism by an upward pull, and pivots in the beam, a load platform supported by one of said pivots, another pivot serving for supporting the beam in the scale, and the third pivot supporting the actuating means aforesaid, said means comprising a tensile member secured above a straight line along which said pivots are arranged in said beam.

42. In a scale, the combination of a horizontal beam, a pendulum, means comprising a tensile member transmitting motion from the beam to the pendulum by an upward pull on the latter, the beam being below the top of said tensile member, and the pendulum being arranged with respect to its bearing to press downward against its bearings during at least a portion of its effective movement.

43. A scale, having a beam, a load counterbalancing element, a bracket loosely supported on the beam, and flexible means secured to the bracket for actuating the load counterbalancing element by a pulling action.

44. In a scale having a beam and an indicator device, a bracket loosely supported on the beam and projecting upward from the same, and an operating connecting element extending from a point in the bracket downward to the indicator device.

45. In a scale having a beam, and a load counterbalancing element, a bracket loosely supported on the beam and projecting upward from the same, and an operative connecting element extending from a point on the bracket downward to the load counterbalancing element.

GEORGE HUTCHINSON.